US012280993B2

(12) United States Patent
Smith et al.

(10) Patent No.: US 12,280,993 B2
(45) Date of Patent: Apr. 22, 2025

(54) SYSTEM FOR VEHICLE LIFT MONITORING AND PROGNOSTICS

(71) Applicant: Vehicle Service Group, LLC, Madison, IN (US)

(72) Inventors: Darian Smith, Madison, IN (US); Rob Elliott, Madison, IN (US); Austin Deuerling, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 18/346,320

(22) Filed: Jul. 3, 2023

(65) Prior Publication Data

US 2023/0339736 A1 Oct. 26, 2023

Related U.S. Application Data

(62) Division of application No. 16/862,527, filed on Apr. 29, 2020, now Pat. No. 11,731,867.

(60) Provisional application No. 62/853,248, filed on May 28, 2019.

(51) Int. Cl.

| | |
|---|---|
| ***B66F 3/00*** | (2006.01) |
| ***B66F 3/46*** | (2006.01) |
| ***B66F 17/00*** | (2006.01) |

(52) U.S. Cl.
CPC ................ *B66F 17/00* (2013.01); *B66F 3/46* (2013.01); *B66F 2700/05* (2013.01)

(58) Field of Classification Search
CPC ...... B66F 3/46; B66F 3/24; B66F 7/16; B66F 7/20; B66F 17/00
See application file for complete search history.

(56) References Cited

U.S. PATENT DOCUMENTS

| | | | |
|---|---|---|---|
| 5,031,727 A | 7/1991 | Clare | |
| 5,642,056 A | 6/1997 | Nakajima et al. | |
| 6,186,280 B1 * | 2/2001 | Healy | B66F 7/20 187/390 |
| 6,983,196 B2 | 1/2006 | Green et al. | |

(Continued)

FOREIGN PATENT DOCUMENTS

| | | |
|---|---|---|
| CN | 110092009 A | 8/2019 |
| WO | 2015/005772 A1 | 1/2015 |

OTHER PUBLICATIONS

Partial European Search Report dated Oct. 8, 2024 (corresponding to EP 24189949.1).

*Primary Examiner* — Lee D Wilson
(74) *Attorney, Agent, or Firm* — Harness, Dickey & Pierce, P.L.C.

(57) ABSTRACT

A vehicle lift system includes a plurality of mobile lift columns each including a wireless communication system for sending and receiving wireless signals, each of the plurality of mobile lift columns further including an inclinometer for detecting an amount of tilt of the plurality of mobile lift columns. A remote control unit includes a wireless communication system capable of transmitting wireless control signals to the plurality of mobile lift columns. A control unit is associated with the plurality of lift columns for controlling operation of the plurality of lift columns, the control unit further receiving a signal indicative of the amount of tilt of the plurality of mobile lift columns and providing a warning signal if any mobile lift column has an amount of tilt exceeding a predetermined amount.

4 Claims, 8 Drawing Sheets

(56) References Cited

U.S. PATENT DOCUMENTS

| | | | | |
|---|---|---|---|---|
| 7,191,038 | B2 | 3/2007 | Green et al. | |
| 10,662,043 | B2 | 5/2020 | De Jong | |
| 11,220,415 | B2 | 1/2022 | Stapensea | |
| 11,319,172 | B2 * | 5/2022 | Kimener | B65G 69/006 |
| 2010/0045093 | A1 | 2/2010 | Foisie | |
| 2015/0232310 | A1 | 8/2015 | Jaipaul | |
| 2015/0246797 | A1 * | 9/2015 | Jaipaul | B66F 3/46 700/213 |
| 2015/0307334 | A1 | 10/2015 | Van Houten et al. | |
| 2016/0052757 | A1 | 2/2016 | De Jong | |
| 2016/0152454 | A1 * | 6/2016 | Stapensea | B66F 9/20 254/89 R |
| 2016/0185580 | A1 | 6/2016 | Luinge | |
| 2016/0272472 | A1 | 9/2016 | Jaipaul et al. | |
| 2017/0088405 | A1 * | 3/2017 | De Jong | B66F 7/28 |
| 2017/0174484 | A1 | 6/2017 | Van Houten et al. | |
| 2018/0179035 | A1 | 6/2018 | De Jong | |
| 2018/0186612 | A1 * | 7/2018 | De Jong | B66F 7/04 |
| 2018/0194601 | A1 * | 7/2018 | Van Houten | B66F 3/46 |
| 2019/0010037 | A1 | 1/2019 | Jaipaul et al. | |
| 2019/0248634 | A1 | 8/2019 | Stapensea | |
| 2020/0377354 | A1 | 12/2020 | Smith et al. | |

* cited by examiner

SYSTEM FOR VEHICLE LIFT MONITORING AND PROGNOSTICS

CROSS-REFERENCE TO RELATED APPLICATIONS

This application is a divisional of U.S. application Ser. No. 16/862,527, filed Apr. 29, 2020, which claims the benefit of U.S. Provisional Application No. 62/853,248, filed May 28, 2019. The entire disclosures of the above applications are incorporated herein by reference.

FIELD

The present disclosure relates to a system for vehicle lift monitoring and prognostics.

BACKGROUND

This section provides background information related to the present disclosure which is not necessarily prior art.

Vehicle lift systems may be used to lift various kinds of vehicles relative to the ground. Some vehicle lift systems are formed by a set of mobile above-ground lift columns. The mobile columns may be readily positioned in relation to the vehicle. The mobile columns may then be activated to lift the vehicle from the ground in a coordinated/synchronized fashion. It may be desirable to provide a system for vehicle lift monitoring and prognostics.

SUMMARY

This section provides a general summary of the disclosure, and is not a comprehensive disclosure of its full scope or all of its features.

A vehicle lift system includes a plurality of mobile lift columns each including a wireless communication system for sending and receiving wireless signals, each of the plurality of mobile lift columns further including an inclinometer for detecting an amount of tilt of the plurality of mobile lift columns. A remote control unit includes a wireless communication system capable of transmitting wireless control signals to the plurality of mobile lift columns. A control unit is associated with the plurality of mobile lift columns for controlling operation of the plurality of lift columns, the control unit further receiving a signal indicative of an amount of tilt of the plurality of mobile lift columns and providing a warning signal if any column has an amount of tilt exceeding a predetermined amount.

According to a further aspect, a vehicle lift system includes a plurality of mobile lift columns each including a hydraulic lift system having a battery for powering the hydraulic lift system. Columns could also be powered from AC mains lines. The plurality of mobile lift columns each include a wireless communication system for sending and receiving wireless signals. Communication could also be through wires between columns. Each of the plurality of mobile lift columns further including a battery voltage sensor and a hydraulic pressure sensor. A remote control unit includes a wireless communication system capable of transmitting wireless control signals to the plurality of mobile lift columns. A control unit is associated with the plurality of mobile lift columns for controlling operation of the plurality of lift columns, the control unit estimating and reporting a current battery condition based upon signals from the battery voltage sensors and the hydraulic pressure sensors of the plurality of mobile lift columns. The control unit can determine a battery deterioration condition based upon a rate of change of voltage of the batter while the battery is under load. Alternatively, the control unit can determine a battery deterioration condition based upon a change in resting voltage between cycles.

According to a further aspect, a vehicle lift system includes a plurality of mobile lift columns each including a hydraulic lift system having a battery for powering the hydraulic lift system. The plurality of mobile lift columns includes a wireless communication system for sending and receiving wireless signals. Each of the plurality of mobile lift columns further includes a battery voltage sensor. A remote control unit having a wireless communication system is capable of transmitting wireless control signals to the plurality of mobile lift columns. A control unit associated with the plurality of lift columns controls operation of the plurality of mobile lift columns. The control unit calculates an amount of charge variation in the system based upon signals from the battery voltage sensors of the mobile lift columns, wherein the control unit provides a warning message if an amount of charge variation between the plurality of mobile lift columns exceeds a predetermined level.

A vehicle lift system includes a plurality of mobile lift columns each including a hydraulic lift system having a battery for powering the hydraulic lift system. The plurality of mobile lift columns each includes a wireless communication system for sending and receiving wireless signals. Each of the plurality of mobile lift columns further includes a hydraulic pressure sensor. A remote control unit includes a wireless communication system capable of transmitting wireless control signals to the plurality of mobile lift columns. A control unit is associated with the plurality of lift columns for controlling operation of the plurality of mobile lift columns. The control unit calculates an amount of load variation in the system based upon the hydraulic pressure sensors of the plurality of mobile lift columns, wherein the control unit provides a warning message if an amount of load variation between the plurality of mobile lift columns exceeds a predetermined level. Alternatively, load could be sensed using a load cell or motor amp draw.

A vehicle lift system includes a plurality of mobile lift columns each including a wireless communication system for sending and receiving wireless signals. A remote control unit includes a wireless communication system capable of transmitting wireless control signals to the plurality of mobile lift columns. A control unit associated with the plurality of mobile lift columns controls operation of the plurality of lift columns. The control unit monitors a message error rate between the remote control unit and the plurality of mobile lift columns and provides a warning signal if the message error rate between the remote control unit and any one of the plurality of mobile lift columns exceeds a predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
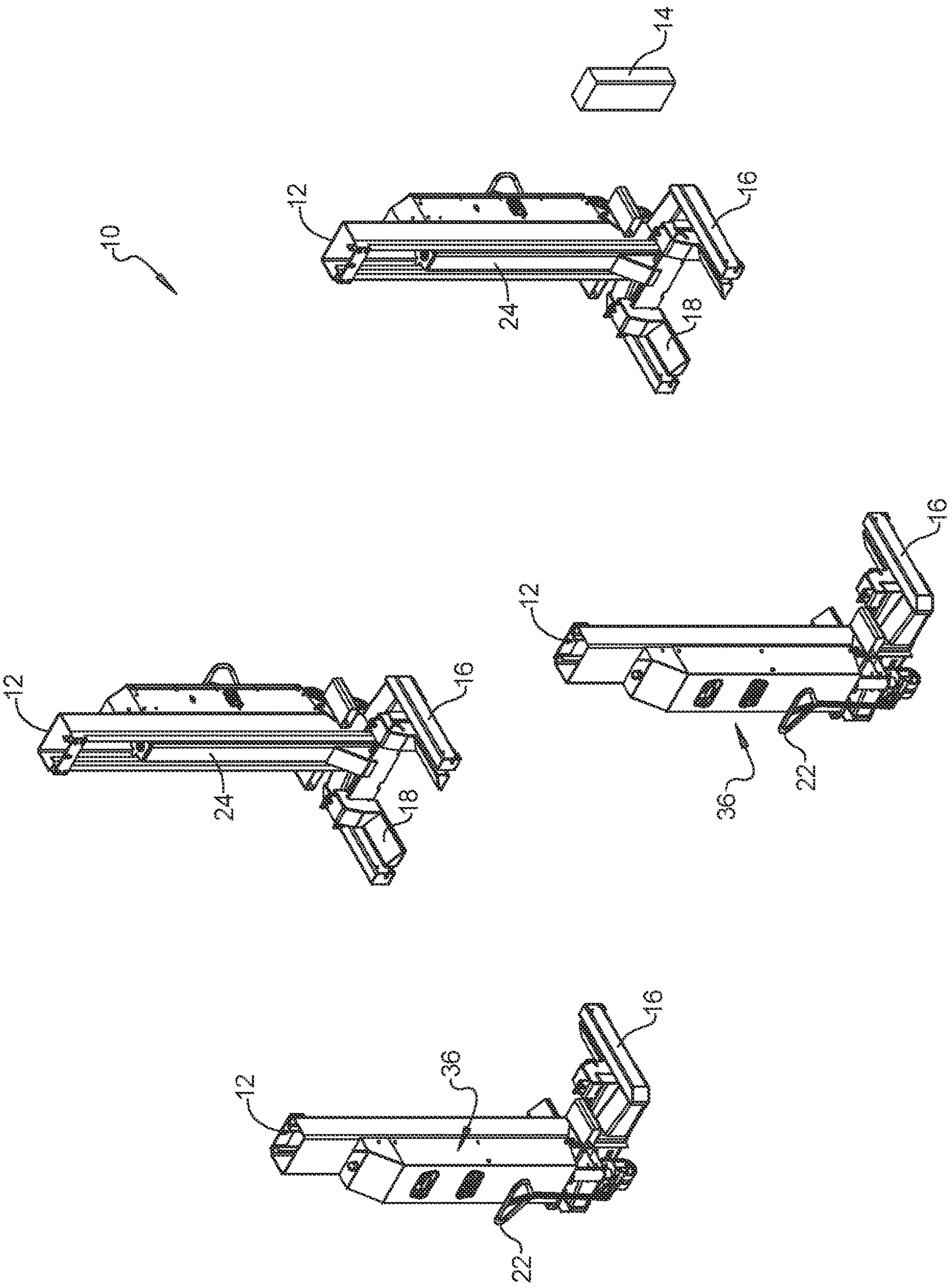
FIG. 1 is a perspective view of an exemplary lift system including four mobile lift columns.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

FIG. 1 illustrating an exemplary lift system 10 comprising a plurality of mobile lift columns 12 and a remote control unit 14. The remote control unit 14 is operable for controlling the mobile lift columns 12 to selectively raise or lower a vehicle relative to the ground. While four mobile lift columns 12 are shown, it should be understood that any other suitable number of columns 12 (e.g., six, eight, etc.) may be used to form the lift system 10. Each mobile lift column 12 is shown to include a set of legs 16 that support mobile lifting column 12 in relation to the ground. Mobile lift column 12 is also shown to include a support fixture or a carrier 18 to provide support of the vehicle in relation to lifting column 12.

Figure 2:
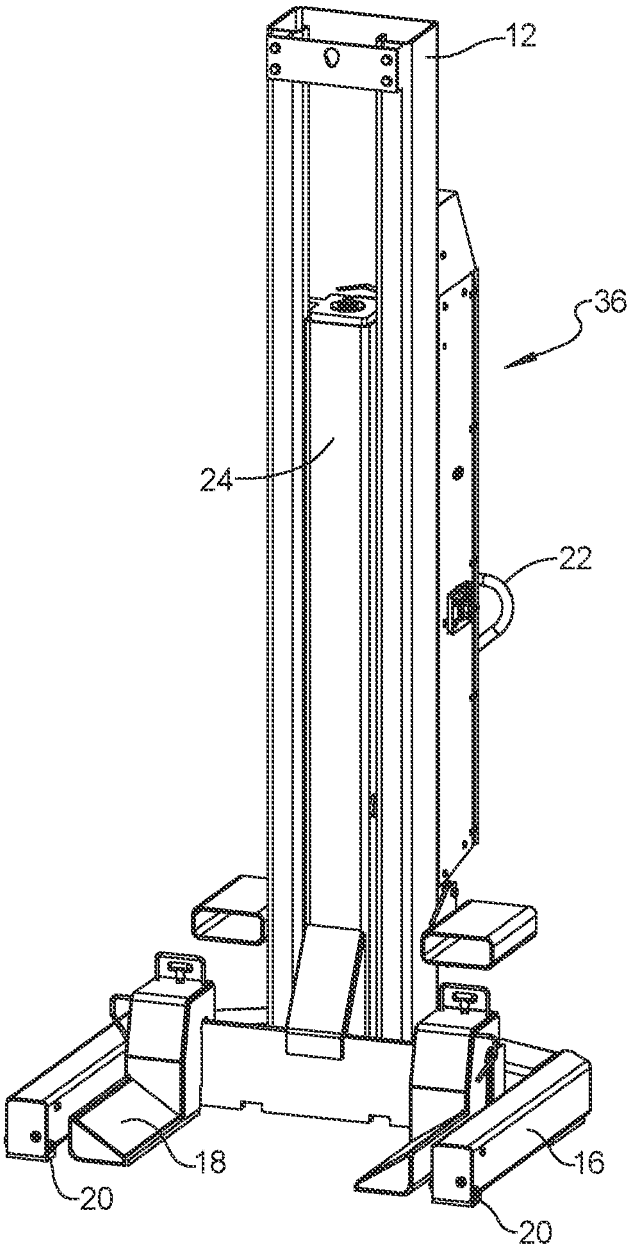
FIG. 2 is a front perspective view of an exemplary mobile lift columns of the lift system.

As further shown in FIG. 2, the mobile lift columns 12 also have wheels 20 and handles 22, permitting the columns 12 to be moved along the ground. The mobile lift columns 12 may thus be selectively positioned with relative ease, as may be desired to accommodate different vehicles having different wheel spacing or numbers of wheels (e.g., to move additional mobile lift columns 12 into place or to move excess mobile lift columns 12 away, etc.), to replace a first mobile lift column 12 with a second mobile lift column 12 for maintenance of the first mobile lift column 12, etc.

As shown in FIG. 2, each mobile lift column 12 further comprises a lift mechanism which is shown as a hydraulic system 24. The hydraulic system 24 is operable to move a carrier 18 vertically relative to the ground. The carrier 18 is configured to engage a component of the vehicle (e.g., the wheel, etc.), to thereby enable the mobile lift columns 12 to raise and lower the vehicle relative to the ground. The configuration of the carrier 18 can vary to accommodate various vehicles as would be understood by one skilled in the art.

Figure 3:
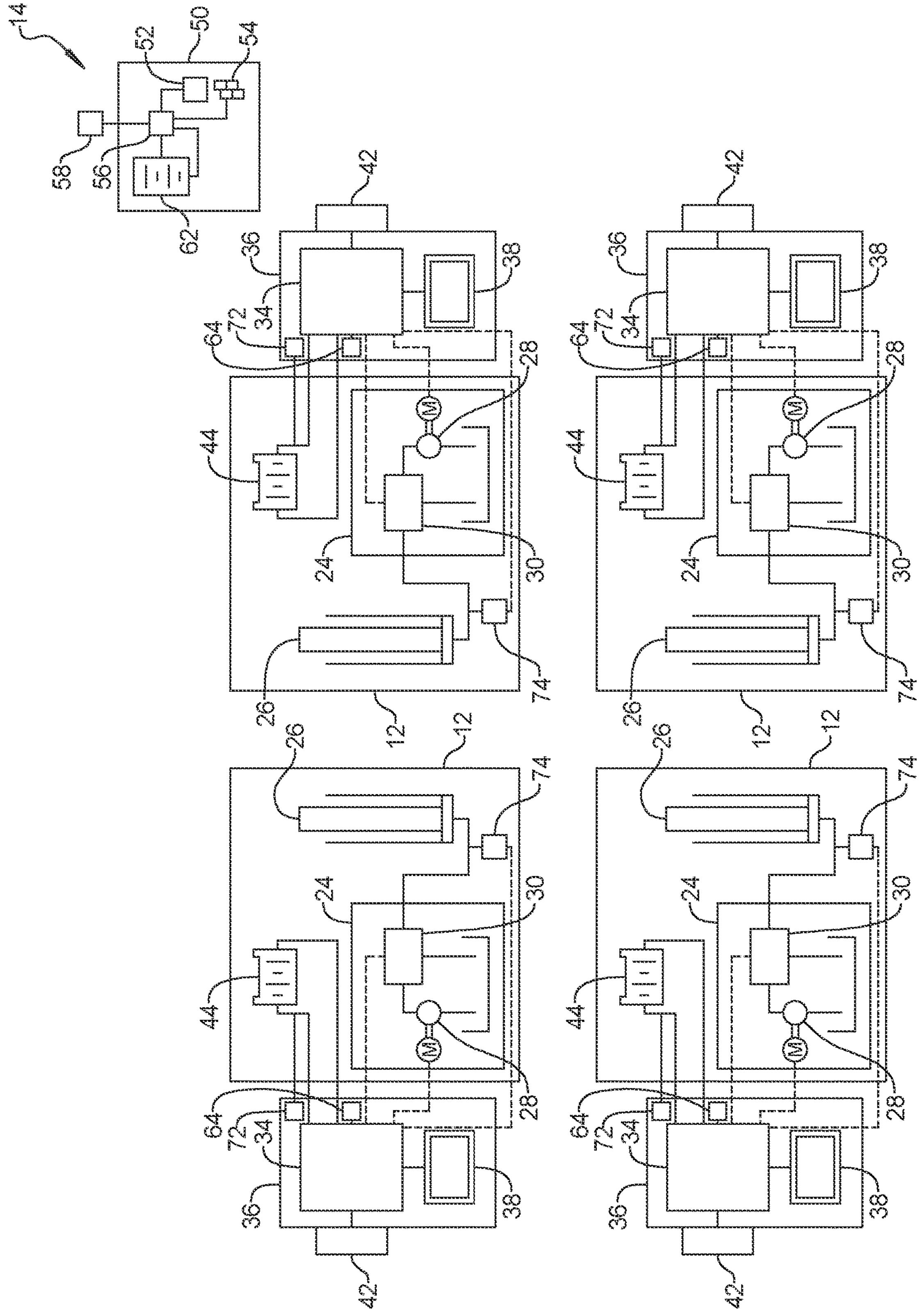
FIG. 3 is a schematic block diagram of the lift system of FIG. 1.

As shown in further detail in FIG. 3, in the exemplary embodiment, each hydraulic system 24 of the present example can include a hydraulic cylinder and piston 26, a pump 28, and a series of valves 30 controlling the flow of hydraulic fluid. In particular, the pump 28 and valves 30 are in fluid communication with hydraulic cylinder and piston 26, such that the pump 28 and the valves 30 communicate fluid to or from the cylinder and piston 26. The carrier 18 ascends and descends with the piston of hydraulic cylinder and piston 26, such that the pump 28 and the valves 30 may be controlled to control the vertical height at which carrier 18 is positioned.

A processor 34 is in electrical communication with the pump 28 and the valves 30 to control operation of the pump 28 and the valves 30. Of course, any other suitable structures, components, or techniques may be used for a hydraulic system 24. For instance, any suitable systems, features, mechanisms, or components may be used in addition to or in lieu of hydraulic system 24, including but not limited to a screw, belt, or gear mechanism, such as to raise or lower carrier 18.

Each lift column 12 further includes a control unit 36, which may be used to control the operation, monitoring, and/or programming of lift system 10. For instance, any one of the control units 36 may be used to define participation in ad hoc column control groups based on available mobile lift columns 12, then control the mobile lift columns 12 while in the ad hoc column control group. Control unit 36 can also have a display 38 that is configured to provide the operator with a visual indication of mobile lift columns 12 have been assigned to the ad hoc column control group. Display 38 may include a graphical representation of a vehicle and graphical representations of the available mobile lift columns 12 positioned in relation to the graphical representation of the vehicle. Control unit 36 may illuminate the graphical representations of the available mobile lift columns 12 that have been selected for the ad hoc control group, providing the operator with immediate visual confirmation mobile of which lift columns 12 have been selected and where those mobile lift columns 12 are in relation to the vehicle. Control unit 36 includes a processor 34, which is operable to process and relay information/commands to/from other components of the control unit 36.

It should be understood that each control unit 36 may be in communication with a remote control unit 14. For instance, when an operator uses a control unit 36 to create an ad hoc column control group, the identity of the columns 12 in that control group may be transmitted to the remote control unit 14. In addition, a lift command entered through control unit 36 may be sent to the remote control unit 14, and remote control unit 14 may then relay the lift command to the mobile lift columns 12 that have been assigned to the ad hoc column control group. The remote control unit may function as the system controller. In alternate embodiments, the system controller may be a separate unit in wireless communication with both the remote control unit 14 and the control unit 36, or the system controller may be one of the control units 36 on one of the columns 12 existing in the system.

A wireless transceiver 42 is also provided at each column 12 represented in FIG. 3, and is operable to wirelessly relay information and commands between a column 12 and the remote control unit 14 as will be described in greater detail below. The wireless transceiver 42 can be a radio frequency (RF) transceiver and/or may take other forms that will be apparent to those of ordinary skill in the art in view of the teachings herein.

As also shown in FIG. 3, mobile lift column 12 includes a respective battery 44. The batteries 44 are rechargeable and are operable to power all aspects of operation of their respective mobile lift columns 12. In particular, each battery 44 is operable to power the pump 28, control unit 36, transceiver 42, and/or any other electrically powered component in each column 12.

The remote control unit 14 can include a housing 50 having a display 52 and a series of input buttons 54. Input buttons may be designated for controlling lift motion or for navigating display menus on the remote control. Input buttons designated for controlling lift motion may only be enabled when the lift system is enabled for wireless remote lift operation. The remote control unit 14 can further include a processor 56 in communication with the display 52 and the series of input buttons 54 as well as a wireless transmitter/receiver 58. The remote control unit 14 includes a battery 62. The battery 62 can be rechargeable and operable to power all aspects of operation of the remote control unit 14. In particular, the battery 62 is operable to power the display 52, the processor 56, the wireless transmitter/receiver 58, and/or any other electrically powered component in the remote control unit 14. The input buttons 54 can be incorporated into a touch screen of the display 52 or can be separate input buttons.

Figure 4:
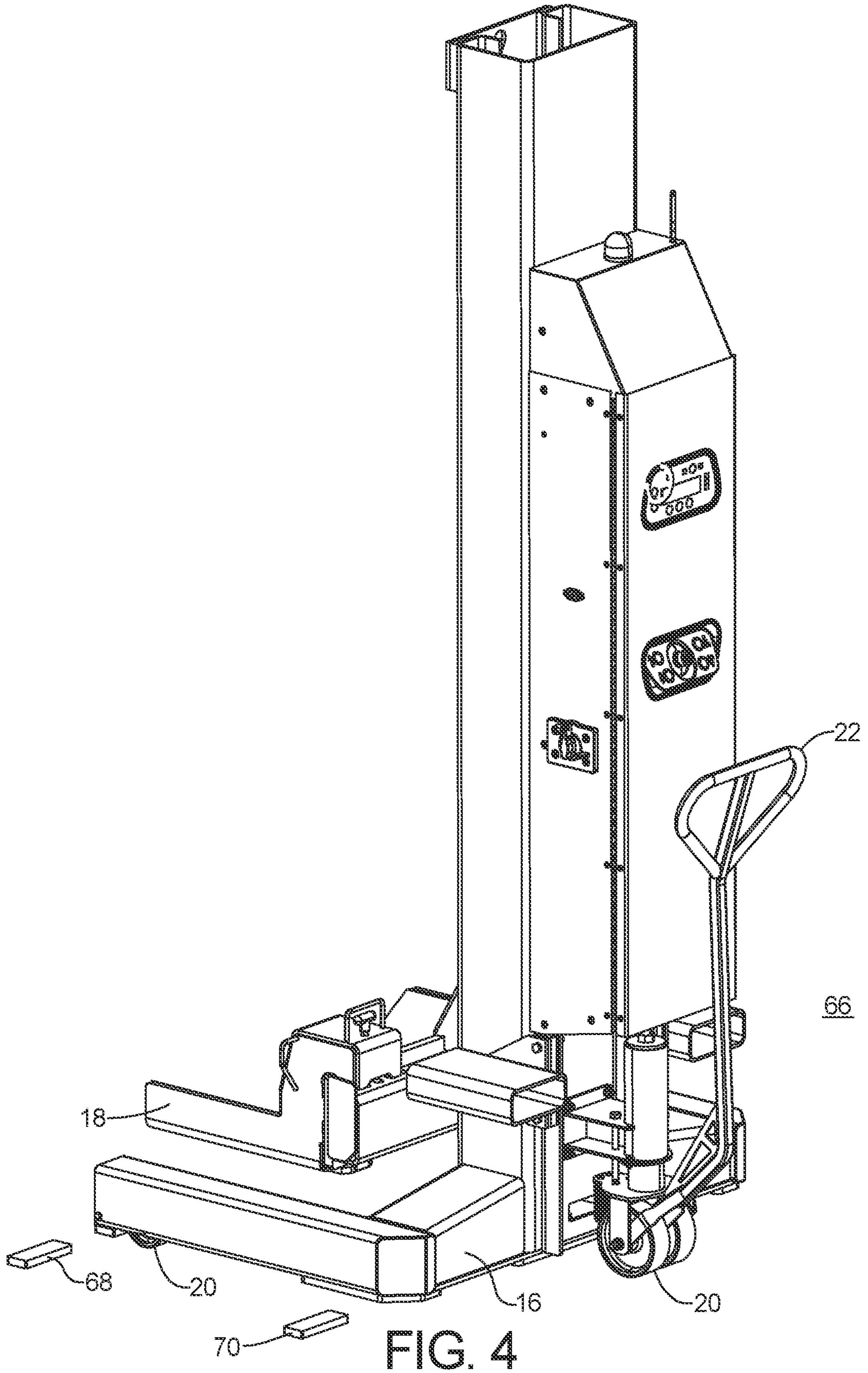
FIG. 4 is an exemplary control unit display of a shimming procedure for leveling a mobile lift column determined to be un-level.

As shown in FIG. 3, each of the mobile lift columns 12 further includes an inclinometer 64 for detecting an amount of tilt of the mobile lift columns 12. The inclinometer 64 can be calibrated to a zero position at which point the column is standing parallel to gravity. The remote control unit 14 can poll each mobile lift column 12 to determine if any column is too far out of level, or if two or more columns are tilted too far in opposite directions that could cause errors during lifting. Based upon the detected amount of tilt of the mobile lift columns 12, the processor 56 of the remote control unit 14 can determine and display a correct shimming procedure for enabling level lifting, as shown in FIG. 4. For example, the shim height may be calculated by multiplying the distance between the shimmed load pads by the tangent of the floor slope angle between them. The remote may then round to the nearest shim height that will minimize the tilt of the column. In the particular, shimming procedure display illustration 66 shown in FIG. 4, the addition of a ½ inch shim plate 68 is recommended to be added to a forward end of the left leg 16 and a ¼ inch shim plate 70 is recommended to be added to a rear end of the left leg 16. It should be understood that other types of level compensation devices could be utilized including height adjustable feet supported by an adjustment screw, by a cam mechanism that can be adjusted to level the mobile lifting columns 12 or an automated leveling system that can be controlled by the remote control unit 14 to compensate for leveling the mobile lift columns 12.

Figure 5:
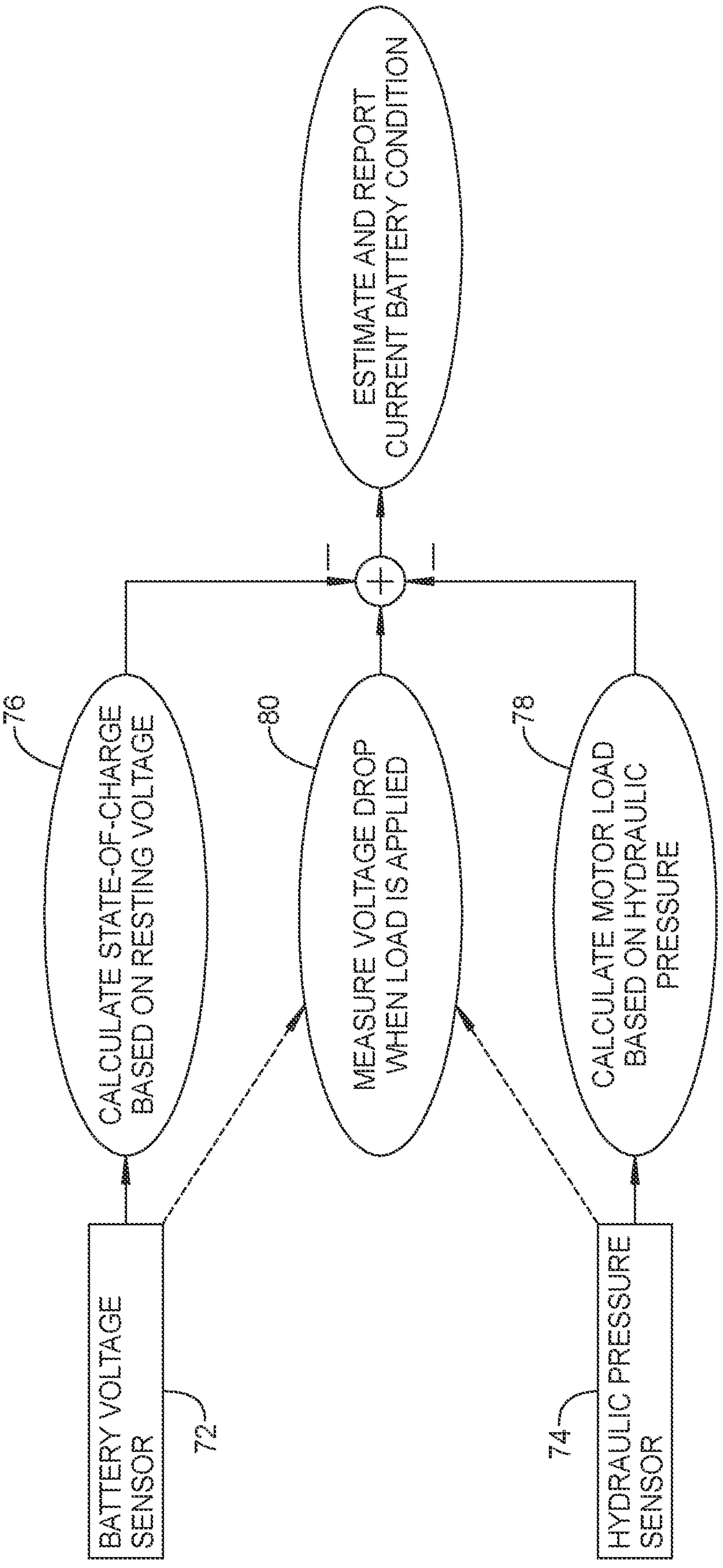
FIG. 5 is a block diagram of a prognostic sequence for determining a battery condition.

With reference to FIG. 3, the mobile lift columns 12 include a battery voltage sensor 72 associated with the batteries 44 and a hydraulic pressure sensor 74 associated with the hydraulic system 24. When a motor load is applied to the battery 44, the voltage will drop and then continue to drift down until the load is removed, at which point the battery voltage will recover back to a new resting voltage. As shown in FIG. 5, the present disclosure uses the battery voltage sensor 72 to calculate the battery state-of-charge of the battery 44 based on a resting voltage at step 76. At step 78, the system calculates a motor load based on the hydraulic pressure from the hydraulic pressure sensor 74. The system further measures the voltage drop of the battery 44 when a load is applied at step 80. For example, based on characterizing a battery, the system may expect a voltage drop of one volt per 4000 pounds of applied load on the carrier 16 for a battery in good condition.

Figure 6:
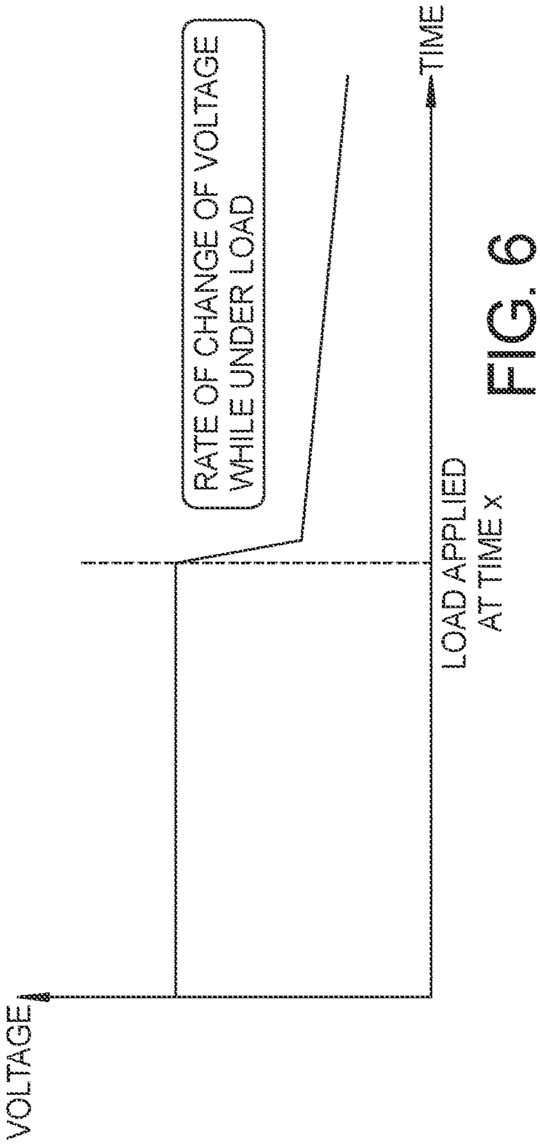
FIG. 6 is a graph of voltage verses time for analyzing a rate of change of voltage while under load for diagnosing a battery deterioration condition.
Figure 7:
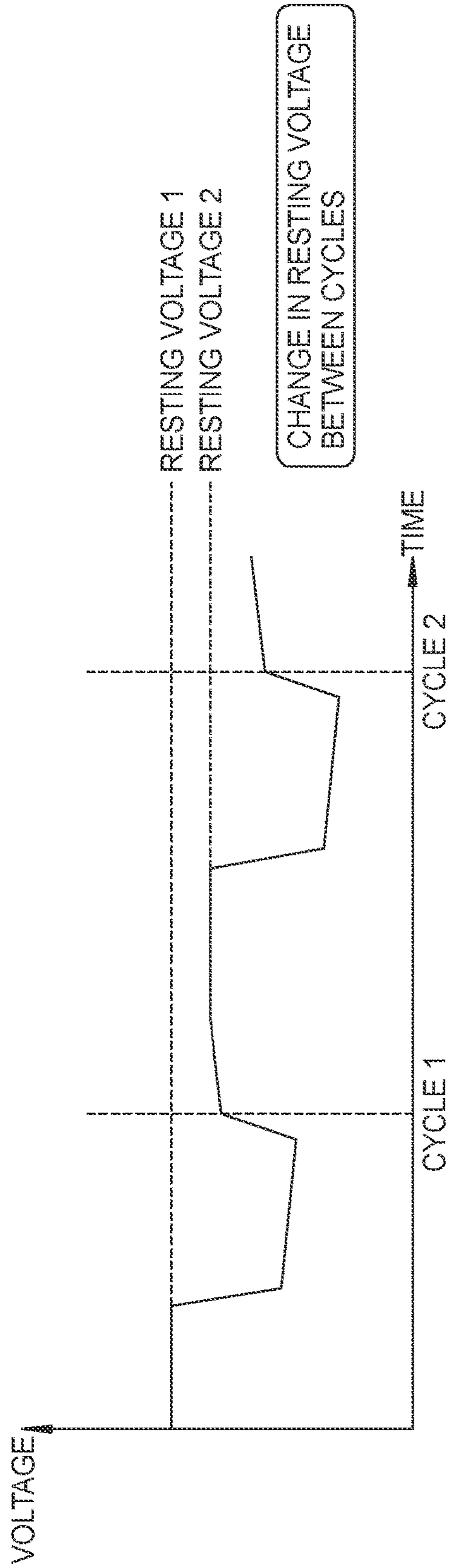
FIG. 7 is a graph of voltage verses time for analyzing a change in resting voltage between cycles for diagnosing a battery deterioration condition.

As shown in FIG. 6, the system can utilize the voltage rate of change of the battery 44 while under load to estimate the battery condition. For example, the system may expect a rate of change of 0.0015 volt/second per 1000 pounds applied to the carrier for a battery in good condition. Further, as shown in FIG. 7, the system can utilize a change in the battery resting voltage between cycles to estimate the battery condition. For example, the system may expect a difference of 0.25V between resting cycles based on a measured load and cycle duration. The system then estimates and reports the current battery condition. If the battery condition does not represent a predetermined battery response condition, the user can be notified that the battery is deteriorating so that maintenance can be considered.

In a lift system, the system controller will monitor the position of separate lifting cylinders and equalize them. In the current state, lift equalization problems may only be found when the component deteriorates to the point of causing out-of-level error messages. The lift will engage a hydraulic correction valve to divert flow and equalize the lift cylinders in the system under normal conditions. In abnormal cases, the controller will have to engage a secondary valve to provide hard equalization in order to equalize the system. Particular factors contributing to hard equalization include an unequal battery state-of-charge amongst mobile lift columns 12, an unequal amount of load amongst the mobile lift columns 12, and the component issues such as a blocked hydraulic valve, a leaky pump and motor wear. The battery voltage sensors 72 and the hydraulic pressure sensors 74 can be utilized to monitor and understand the amount of equalization caused by abnormal causes and provide an indicator that an equalization component may be out-of-tolerance for troubleshooting and maintenance purposes.

Figure 8:
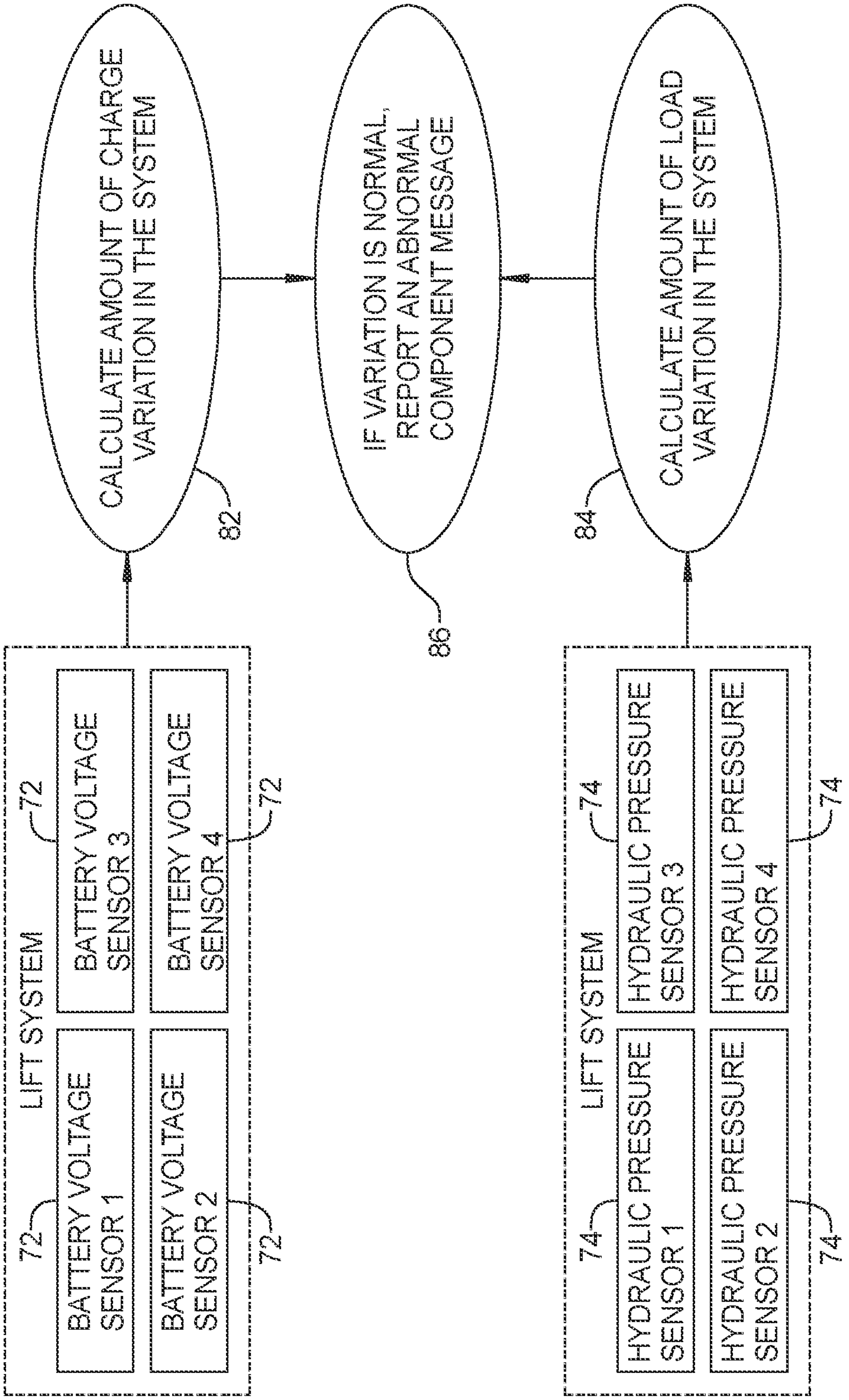
FIG. 8 is a block diagram of a prognostic sequence for detecting an abnormal mobile lift column component condition.

As shown in FIG. 8, the prognostic sequence can include calculating an amount of charge variation in the system based on each of the battery voltage sensors 72 of the mobile lift columns 12, at step 82. In addition, the system can calculate an amount of load variation in the system based on each of the hydraulic pressure sensors 74 of the mobile lift columns 12, at step 84. The system can then determine if the variation is normal or can report an abnormal component message if the variation is abnormal at step 86. For instance, if the system detects a variation in battery voltage of greater than five volts, the system would alert the user to check battery charge and status. Alternatively, if the difference in loads between columns is above 3:1, the system would alert the user to check and redistribute the weight. If battery and loading are within tolerance, the system would recommend a service call to inspect the hydraulic system.

Figure 9:
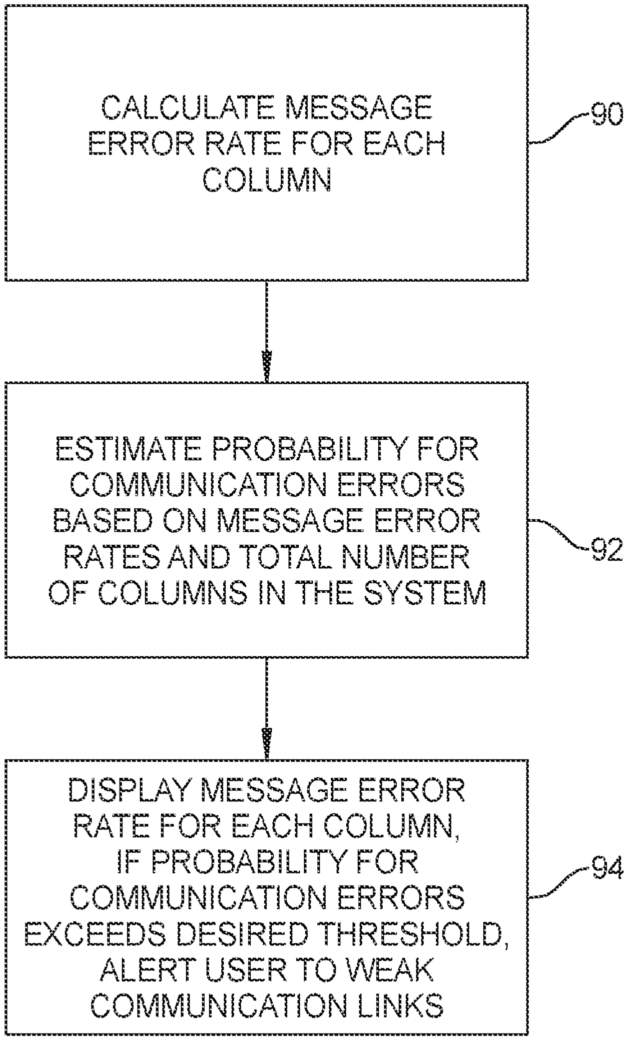
FIG. 9 is a block diagram of a prognostic sequence for monitoring message error rates between the remote control unit and the plurality of mobile lift columns.

The present disclosure can also monitor the message error rate between the individual mobile lift columns 12 and the system controller of the mobile column lift system. The systems can give a user an indication of marginally performing radio links before communication errors start to occur frequently. As shown in FIG. 9, the processor can calculate the message air rate for each mobile lift column 12 at step 90. At step 92, the system can estimate the probability for communication errors based on message error rates and the total number of mobile lift columns 12 in the system. The system can then display a message error rate for each column, if the probability for communication errors exceeds a desired threshold, the user can be alerted to the weak communication link resulting in a message error rate above the desired threshold at step 94. For instance, the system may be comprised of four columns and the system controller may send twenty messages per second evenly amongst the columns. An error may be generated if a response is not heard from every column within a predetermined time, such as one second. The user may wish to be alerted if the message error rates results in a greater than 50% chance of error in ten minutes of operation. The probability of error can be calculated as 1-(1-(1-(error rate))^(messages sent by remote per second/total number of columns))^((desired minutes between error)*60). In this case, if the message error rate of any column goes above 25%, the system will alter the user to the weak radio link. The system may further indicate whether messages were missed when sent from the system controller or the column controller to isolate which radio may be faulty.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle lift system, comprising:

a plurality of mobile lift columns, each of the plurality of mobile lift columns further including an inclinometer for detecting an amount of tilt of the plurality of mobile lift columns;

a control unit associated with the plurality of lift columns for controlling operation of the plurality of mobile lift columns, the control unit further receiving a signal indicative of the amount of tilt of the plurality of mobile lift columns and providing a warning signal if any mobile lift column has an amount of tilt exceeding a predetermined amount, wherein the control unit determines if two or more mobile lift columns are tilted too far in opposite directions that could cause errors during lifting.

2. A vehicle lift system, comprising:

a plurality of mobile lift columns, each of the plurality of mobile lift columns further including an inclinometer for detecting an amount of tilt of the plurality of mobile lift columns;

a control unit associated with the plurality of lift columns for controlling operation of the plurality of mobile lift columns, the control unit further receiving a signal indicative of the amount of tilt of the plurality of mobile lift columns and providing a warning signal if any mobile lift column has an amount of tilt exceeding a predetermined amount, wherein the control unit displays a tilt correction procedure for enabling level lifting.

3. The vehicle lift system according to claim 2, wherein the tilt correction procedure includes inserting shim plates under legs of the mobile lift columns.

4. A vehicle lift system, comprising:

a plurality of mobile lift columns each including a wireless communication system for sending and receiving wireless signals;

a system controller having a wireless communication system capable of transmitting wireless control signals to the plurality of mobile lift columns; and a control unit associated with the plurality of lift columns for controlling operation of the plurality of lift columns, the control unit monitoring a message error rate between the system controller and the plurality of mobile lift columns and wherein the control unit displays a warning signal if the message error rate between the system controller and any of the plurality of mobile lift columns exceeds a predetermined threshold.

* * * * *